US011908416B2

(12) United States Patent
Wen et al.

(10) Patent No.: US 11,908,416 B2
(45) Date of Patent: Feb. 20, 2024

(54) DYNAMIC IRC AND ELVSS FOR DISPLAY DEVICE

(71) Applicant: Google LLC, Mountain View, CA (US)

(72) Inventors: Chien-Hui Wen, Cupertino, CA (US); Sang Young Youn, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/920,719

(22) PCT Filed: May 10, 2021

(86) PCT No.: PCT/US2021/031630

§ 371 (c)(1),
(2) Date: Oct. 21, 2022

(87) PCT Pub. No.: WO2022/240389

PCT Pub. Date: Nov. 17, 2022

(65) Prior Publication Data

US 2023/0306912 A1 Sep. 28, 2023

(51) Int. Cl.
*G09G 3/3258* (2016.01)
*G09G 3/34* (2006.01)

(52) U.S. Cl.
CPC ......... *G09G 3/3258* (2013.01); *G09G 3/3406* (2013.01); *G09G 2360/144* (2013.01)

(58) Field of Classification Search
CPC ....................... G09G 3/3258; G09G 2360/144
See application file for complete search history.

(56) References Cited

U.S. PATENT DOCUMENTS

| | | | |
|---|---|---|---|
| 2008/0158211 A1 | 7/2008 | Kwon | |
| 2010/0156864 A1 | 6/2010 | Chae et al. | |
| 2016/0232842 A1 | 8/2016 | Imai et al. | |
| 2016/0314760 A1 | 10/2016 | Jangda et al. | |
| 2019/0080656 A1 | 3/2019 | Herranz et al. | |
| 2019/0088199 A1* | 3/2019 | Zhang .................. | G09G 3/3258 |
| 2019/0114020 A1* | 4/2019 | Ding ...................... | H10K 59/13 |

(Continued)

OTHER PUBLICATIONS

International Search Report and Written Opinion in International Appln. No. PCT/US2021/031630, dated Jan. 26, 2022, 15 pages.

(Continued)

*Primary Examiner* — Dennis P Joseph
(74) *Attorney, Agent, or Firm* — Fish & Richardson P.C.

(57) ABSTRACT

A method, includes: (i) receiving information about an ambient light level; (ii) receiving image frame data for an active matrix display panel with an array of pixels each having a light emitting diode (LED) and a pixel circuit to control current supplied to the LED; (iii) selecting a selected current-resistance compensation (IRC) setting based on the information about the ambient light value; (iv) selecting a selected source voltage level based on the selected IRC setting that was selected by the computing system; (v) generating compensated image frame data for the image frame based on the received image frame data and the selected IRC setting; and (vi) displaying the image frame by supplying data signals based on the compensated image frame data to corresponding pixels from the array of pixels, while applying a source voltage corresponding to the selected source voltage level to all of the pixels.

20 Claims, 3 Drawing Sheets

(56) References Cited

U.S. PATENT DOCUMENTS

| | | | |
|---|---|---|---|
| 2019/0237001 | A1 | 8/2019 | Lin et al. |
| 2020/0302861 | A1 | 9/2020 | Pyo et al. |

OTHER PUBLICATIONS

Veygman, “A Simple Implementation of LCD Brightness Control Using the MAX44009 Ambient-Light Sensor.” Application Note 4913, Jan. 21, 2011, 10 pages.

Xda-developers.com [online], “Google Pixel 4 & 4 XL Display Analysis—Outshined by serious phonemakers” Nov. 15, 2019, retrieved on May 15, 2023, retrieved from URL <https://www.xda-developers.com/google-pixel-4-4-xl-display-analysis/>, 33 pages.

Xda-developers.com [online], “Google Pixel 5 Display Review: Worthy of a Flagship” Nov. 24, 2020, retrieved on May 15, 2023, retrieved from URL <https://www.xda-developers.com/google-pixel-5-display-review/>, 36 pages.

* cited by examiner

DYNAMIC IRC AND ELVSS FOR DISPLAY DEVICE

CROSS-REFERENCE TO RELATED APPLICATION

This application is a National Stage Application under 35 U.S.C. § 371 of International Application No. PCT/US2021/031630, filed on May 10, 2021. The disclosure of the prior application is considered part of and is incorporated by reference in the disclosure of this application.

BACKGROUND

Modern mobile devices are used in a variety of ambient lighting environments. For example, a mobile device such as a smartphone (e.g., a pixel phone) or a tablet computer can be used in environments ranging from a darkened room or outdoors at night to direct sunlight. Typically, it is desirable to operate the device's display at higher brightness levels when the ambient light level is higher. However, higher brightness operation generally uses more power than lower brightness operation. Accordingly, many devices include an ambient light sensor to detect the ambient light level and adjust the brightness of the display responsive to changes in the ambient light level.

Furthermore, organic light emitting diode (OLED) display panels, in which the luminance of an OLED pixel depends on the current driven through the diode, variations in the intrinsic resistance of data lines to each pixel can result in variations in the current, and therefore luminance, of a pixel diode across a display panel. Current-resistance compensation (IRC) can be used to compensate for such variations to improve display brightness uniformity.

SUMMARY

In general, in one aspect, the disclosure features a method, including: (i) receiving, by a computing system, information about an ambient light level; (ii) receiving, by the computing system, image frame data for displaying an image frame on an active matrix display panel with an array of pixels, each pixel having a light emitting diode (LED) and a pixel circuit configured to control an electric current supplied to the LED; (iii) selecting, by the computing system, a selected current-resistance compensation (IRC) setting from various IRC settings based on the information about the ambient light value; (iv) selecting, by the computing system, a selected source voltage level from various source voltage levels based on the selected IRC setting that was selected by the computing system based on the information about the ambient light value; (v) generating, by the computing system, compensated image frame data for the image frame based on the received image frame data and the selected IRC setting that was selected by the computing system based on the information about the ambient light value; and (vi) displaying the image frame by supplying data signals based on the compensated image frame data to corresponding pixels from the array of pixels, while applying a source voltage corresponding to the selected source voltage level to all of the pixels.

Implementations of the method can include one or more of the following features and/or features of other aspects. For example, the source voltage can be applied to a cathode of the LED of each pixel from the array of pixels. The computing system can select the selected IRC setting based on a pixel ratio of the image frame.

Current-resistance compensation can be turned on for the selected IRC setting. Alternatively, current-resistance compensation can be turned off for the selected IRC setting.

In some implementations, the computing system is configured to: (i) select, as the selected source voltage level, a first source voltage level responsive to the ambient light level indicating a first ambient light; and (ii) select, as the selected source voltage level, a second source voltage level responsive to the ambient light level indicating a second ambient light level, the first ambient light level being higher than the second ambient light level, and the first source voltage level being higher than the second source voltage level.

Each pixel can include a red LED, a green LED, and a blue LED, and for at least one of the plurality of IRC settings, an IRC ratio is equal to one, the IRC ratio being equal to (LR+LG+LB)/LW where LR, LG, LB, and LW correspond to a luminance of the display panel for full screen red, green, blue, and white emission, respectively. The computing system can be configured to: (i) select, as the selected IRC setting, a first IRC setting responsive to the ambient light level indicating a first ambient light level; and (ii) select, as the selected IRC setting, a second IRC setting responsive to the ambient light level indicating a second ambient light level, the first ambient light level being higher than the second ambient light level, and the first IRC setting having a higher IRC ratio than the second IRC setting. The selected IRC ratio can be greater than one, preferably 1.3 or more, and more preferably 1.6 or more.

The computing system can select the selected source voltage level from a look up table comprising the plurality of source voltage levels.

The display panel can be an organic light emitting diode (OLED) display panel.

In general, in another aspect, the disclosure features a device, including: (i) an active matrix display panel with an array of pixels each having a light emitting diodes (LED) and a pixel circuit configured to control an electric current supplied to the LED, wherein during operation a luminance of each pixel depends on a data signals for each pixel for an image frame and a source voltage applied to all of the pixels; (ii) an ambient light sensor; and (iii) a computing system in communication with the display panel and the ambient light sensor. The computing system is configured to receive information about an ambient light level from the ambient light sensor and image frame data for an image frame to be displayed on the display panel, and to select among various source voltage levels and various current-resistance compensation (IRC) levels based on the information about the ambient light value and apply the source voltage to all of the pixels at the selected source voltage level and to direct compensated data signals to the pixels to display the image frame, the compensated data signals corresponding to pixel data corrected based on the selected IRC setting.

Embodiments of the device can include one or more of the following features and/or features of other aspects. For example, the computing system can include a display driver integrated circuit configured to select among the plurality of source voltage levels and IRC settings and generate the compensated data signals and a source voltage selection signal based on the selected source voltage level and the selected IRC setting. The display driver integrated circuit can includes a look up table for setting the source voltage level. The display driver integrated circuit can include a register for setting the IRC setting. The display driver integrated circuit can include a power management integrated circuit configured to receive the selected source voltage level and apply the source voltage to all the pixels.

The source voltage can be applied to a cathode of the OLED of each of the pixels.

Each pixel circuit can include multiple transistors.

For a first ambient light level the computing system can be configured to select a first source voltage level and for a second ambient light level the computing system can be configured to select a second source voltage level, the first ambient light level being higher than the second ambient light level and the first source voltage level being higher than the second source voltage level. Each pixel can include a red LED, a green LED, and a blue LED, and for the first ambient light level the computing system is configured to select a first IRC setting and for the second ambient light level the computing system is configured to select a second IRC setting, the first IRC setting having a higher IRC ratio than the second IRC setting, the IRC ratio being equal to (LR+LG+LB)/LW where LR, LG, LB, and LW correspond to a luminance of the display panel for full screen red, green, blue, and white emission, respectively.

The display panel is can be organic light emitting diode (OLED) display panel.

The device can be a smart phone, a tablet computer, or a wearable device.

Among other advantages, implementations disclosed herein can enable AMOLED display panel operation with a high peak brightness capability (e.g., a high brightness mode of 600 nits or more), while balancing battery life and color accuracy when needed, thereby providing an improved user experience across a variety of ambient environments. For example, devices including the display panel can utilize multiple IRC levels and source voltage levels to dynamically adjust brightness based on ambient light conditions.

Other advantages will be apparent from the description below.

BRIEF DESCRIPTION OF THE DRAWINGS

Like reference numbers in different figures denote like elements.

DETAILED DESCRIPTION

Figure 1:
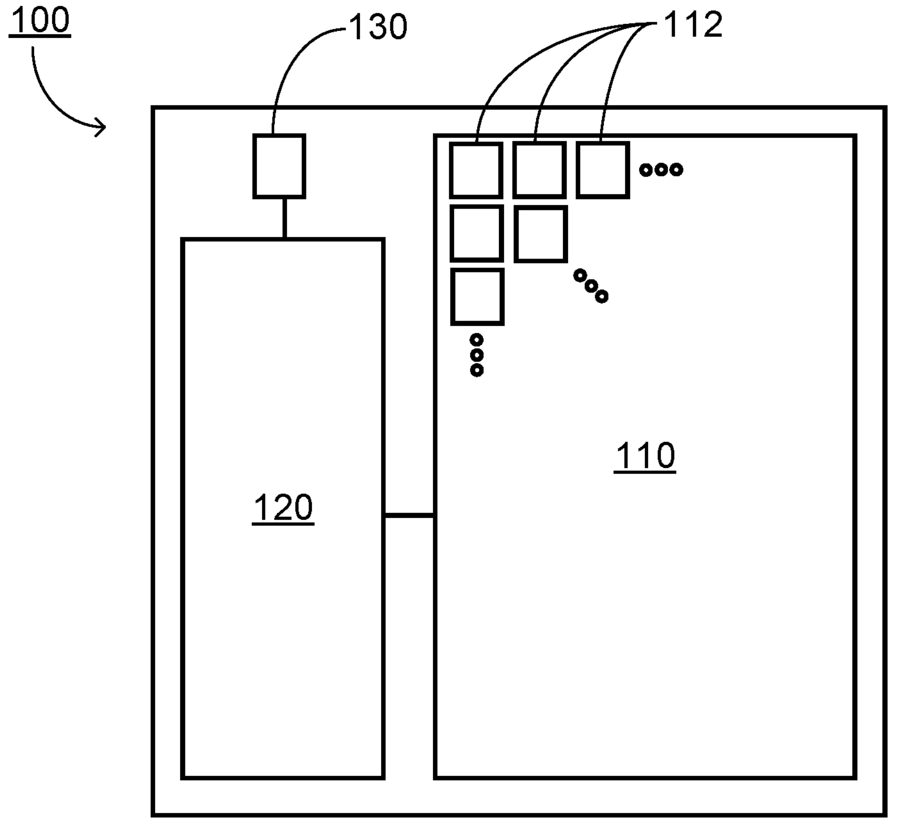
FIG. 1 is a schematic diagram of an example device that includes an AMOLED display panel.

Referring to FIG. 1, a device 100 (e.g., a mobile phone) includes an active matrix organic light emitting diode (AMOLED) display panel 110, a computing system 120, and an ambient light sensor 130. During operation, the ambient light sensor 130 monitors an ambient light level of the environment in which the device is being used and provides a signal indicative of this level to the computing system 120.

The display panel 110 includes an array of pixels 112 each having one or more OLEDs and a corresponding pixel circuit to drive the OLED based on signals from the computing system 120. As described below, the computing system 120 adjusts the brightness level of the AMOLED display panel 110 based on the ambient light level by adjusting a source voltage and a current-resistance correction (IRC) level applied by the control module 120 to the display panel 110.

Figure 2:
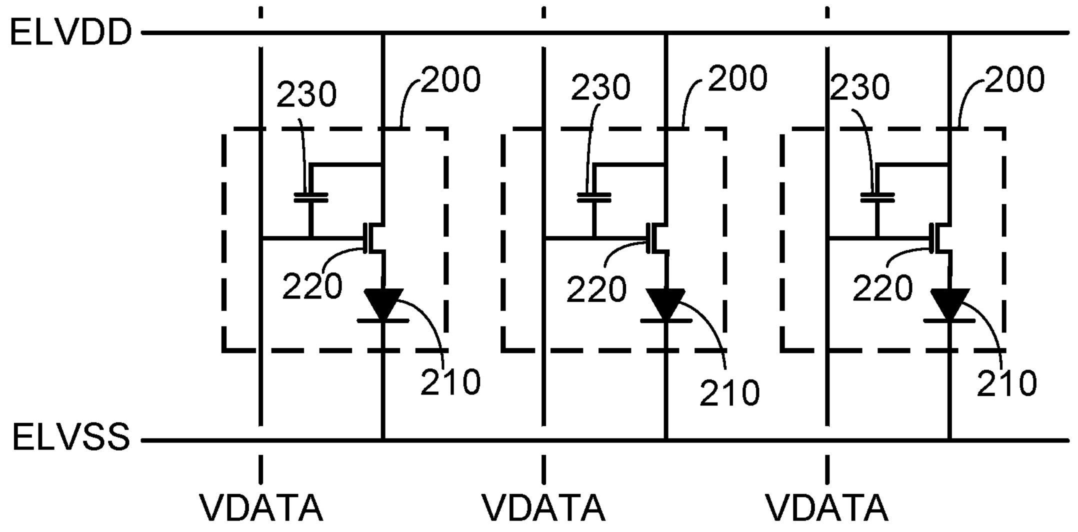
FIG. 2 is a circuit diagram of an example pixel circuit in an AMOLED display panel.

Referring also to FIG. 2, example pixel circuits 200 for three pixels are shown. Each pixel circuit includes an OLED 210 connected to the drain of a transistor 220. The transistor 220 gate is connected to a data line which carries data signals, VDATA, to the pixel circuit. A capacitor 230 is also connected to the data line and to a first source voltage ELVDD. The transistor 220 source is also maintained at ELVDD and the cathode of OLED 210 is maintained at a second source voltage ELVSS. The transistor 220 drain is connected to the OLED 210 anode. Accordingly, transistor 220 controls a flow of current through OLED 210 in response to VDATA signals from the data line. Typically, each column of pixels in a display panel will share a data line and each row will share a scan line (not shown in FIG. 2).

Generally, the difference between the source voltages ELVDD and ELVSS corresponds to the voltage drop across each OLED pixel, and hence the current flow when transistor 220 is on. The maximum brightness of each OLED is related to this voltage difference and a higher brightness setting for the display panel typically needs a higher source voltage. Display panels with a single source voltage setting often have the source voltage set at a high value, however operating the display at lower brightness settings with a high source voltage level can result in inefficient power use that depletes the power source of the device.

More generally, pixel circuit 200 is a simple example of a pixel circuit for an AMOLED. Other more complex circuits are contemplated. For example, in some embodiments, each pixel circuit includes more than one transistor, e.g., five transistors, seven transistors, or more. Additional transistors can, for example, switch a pixel circuit on or off using a scan line, allowing columns of pixels to be addressed using a common data line.

Furthermore, in full color displays, each pixel typically includes three or more OLED sub-pixels each having an OLED configured to emit a different color (e.g., red, green, and blue) light in order to provide full color imagery. In such displays, each sub-pixel can include its own pixel circuit allowing the light level of each color to be adjusted independently of the other color OLEDs composing the pixel.

In general, control module 120 includes integrated circuits and other electronic components that cooperate together to receive input from various input sources including ambient light sensor 130, process that input, and generate output via one or more output channels including display panel 110. In general, control module 120 includes one or more data processing units and a power source. In addition, control module 120 includes a display driver integrated circuit (DDIC) that receives image data, e.g., from memory in control module 120, and directs control signals to display panel 110 to display imagery on the display panel. The control signals can include data signals (VDATA) scan line signals and ELVSS and ELVDD from a power management controller.

Figure 3:
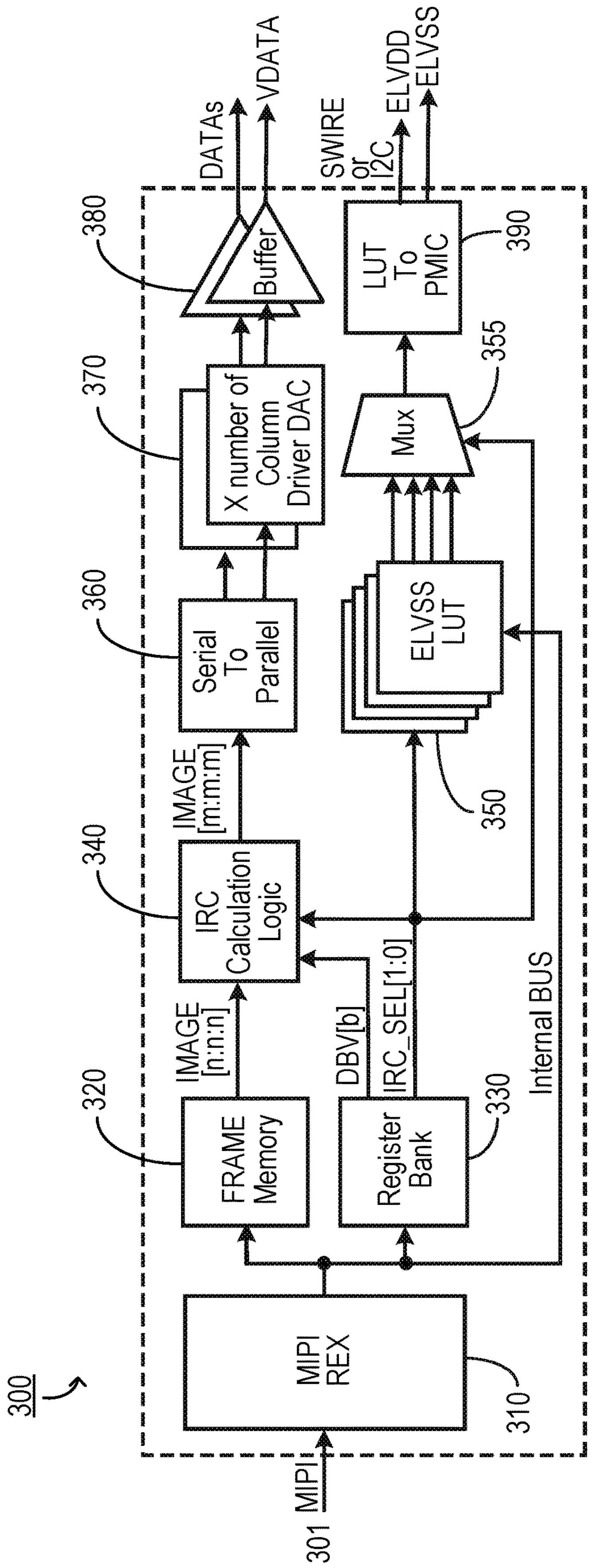
FIG. 3 is a schematic diagram of an example display driver integrated circuit for an AMOLED display panel.

Referring to FIG. 3, an example DDIC 300 includes a MIPI receiver (RX) 310, a frame memory 320, a register bank 330, IRC calculation logic 340, and an ELVSS look up table (LUT) 350. A multiplexer (mux) 355 connects LUT 350 with a power management integrated circuit (PMIC) 390, which generates the source voltages ELVDD and ELVSS for the display. The DDIC 300 interfaces with other components of the device through a mobile industry processor interface (MIPI) 301. The MIPI RX 310 receives data, including ambient light information and image frame data, from MIPI 301. The MIPI RX 310 directs image frame data to frame memory 320 and ambient light information to register bank 330. In turn, IRC calculation logic 340 receives the image frame information (IMAGE[n:n:n]) from the frame memory 320 and the ambient light information (DBV[b], the dynamic brightness value) and an IRC setting (IRC SEL[1:0]) from the register bank 330. When the IRC is ON, performs operations to compensate the image frame information to correct for the current-resistance variations discussed previously. For example, where DBV[b] corresponds to a low ambient light environment, the IRC setting may be set to include IRC ON so that color accuracy across the display panel is good. Alternatively, where DBV[b] corresponds to a bright ambient light environment, the IRC setting can be set with IRC OFF in order to operate at high brightness at the expense of color uniformity.

The various IRC settings can be programmed into the DDIC 300 during calibration of the display panel, calibration of the device, and/or calibration at some other stage before the device reaches the end user.

The DDIC 300 also includes a serial to parallel converter 360, a number of column driver digital-to-analogue converters 370, and frame buffers 380 which output signals to the data lines VDATA on the display panel. The serial to parallel converter 360 receives compensated image frame data (IMAGE[m:m:m]) from the IRC calculation logic 340, parallelizes the data, and directs it to the column driver digital-to-analogue converters 370. The signals from column driver digital-to-analogue converters 370 are buffered at frame buffers 380 before being delivered as VDATA to the pixel via data signal lines. Usually, these data signal lines are shared by pixels in the same column.

In general, LUT 350 can provides a look up table for setting an ELVSS level based on the IRC setting from register bank 330 and output from the IRC calculation logic 340. The ELVSS can be a multi-bank look up table. The ELVSS LUT 350 can be programmed during a calibration operation of display panel (e.g., at the display factory, device factory, or at some other place before reaching the end user). Alternatively, or additionally, the ELVSS LUT 350 can be overwritten by software through the MIPI 301, e.g., through the user interface of the device's operating system or as an update to the operating system. The ELVSS can also programmed in the DDIC with multiple settings.

Mux 355 outputs the ELVSS level from LUT 350 to PMIC 390 which, in turn, applies the source voltages ELVSS and ELVDD across each pixel circuit. For example, ELVSS values can be changed from −1.0V to −4.5V depending on DVB value and image value and IRC setting. Generally, the larger the DVB value, the brighter the image, the bigger IRC ratio then lower ELVSS is required.

In general, the device 100 can be programmed with any number of different IRC settings (e.g., three or more, four or more, five or more, six or more, such as up to 10 different IRC settings). For example, in a simple example, device 100 can be programmed so that the IRC function is either ON or OFF. Color accuracy can decrease when IRC is off due to intrinsic resistance, and hence current, variations across the display panel. For example, the intrinsic resistance due to signal lines that deliver signals (e.g., VDATA) to different pixel columns can increase the further the signal line is from the DDIC. Accordingly, the amount of current delivered at a fixed brightness level can decrease the further from the DDIC the pixel is, resulting in a dimmer pixel further from the DDIC at the same color setting. The IRC function can compensate for such effects by adjusting VDATA for pixels (e.g., to increase current) depending on their location relative to the DDIC.

In some embodiments, the device 100 is programmed so that different IRC settings feature different IRC ratios. The IRC ratio refers to the ratio $(L_R+L_G+L_B)/L_W$, where $L_R$ refers to the display panel's luminance at full screen red, $L_G$ refers to the display panel's luminance at full screen green, $L_B$ refers to the display panel's luminance at full screen blue, and $L_W$ refers to the display panel's luminance at full screen white. Typically, the IRC ratio will vary depending on the ambient light level in a range between 1 and 1.8. In general, it is believed that a lower IRC ratio (e.g., less than 1.2, 1.1 or less, such as 1) can provide better color accuracy than relatively higher IRC ratios (e.g., 1.5 or more, 1.6 or more, 1.7 or more). Intermediate IRC ratio settings are also possible (e.g., between 1.2 and 1.5, such as 1.3 or more, 1.4 or more).

In some embodiments, and by way of example, device 100 has three different IRC settings as described below. A first IRC setting has the IRC ON and has an IRC ratio of 1. A second setting has the IRC OFF and the IRC ratio of 1.3. A third setting has the IRC OFF and the IRC ratio of 1.6.

Table 1 below compares the relative performance for these three different IRC settings and at three different ELVSS source voltage levels.

TABLE 1

| | IRC ON IRC Ratio = 1 | IRC OFF IRC Ratio = 1.3 | IRC OFF IRC Ratio = 1.6 |
|---|---|---|---|
| Brightness at 1% OPR | 1,000 | 1,300 | 1,600 |
| Brightness at 100% OPR | 1,000 | 1,000 | 1,000 |
| Color accuracy | Good | Medium | Poor |
| ELVSS | Low | Medium | High |

Here, OPR refers to the on pixel ratio, the percentage of pixels that emit light for an image frame.

Figure 4:
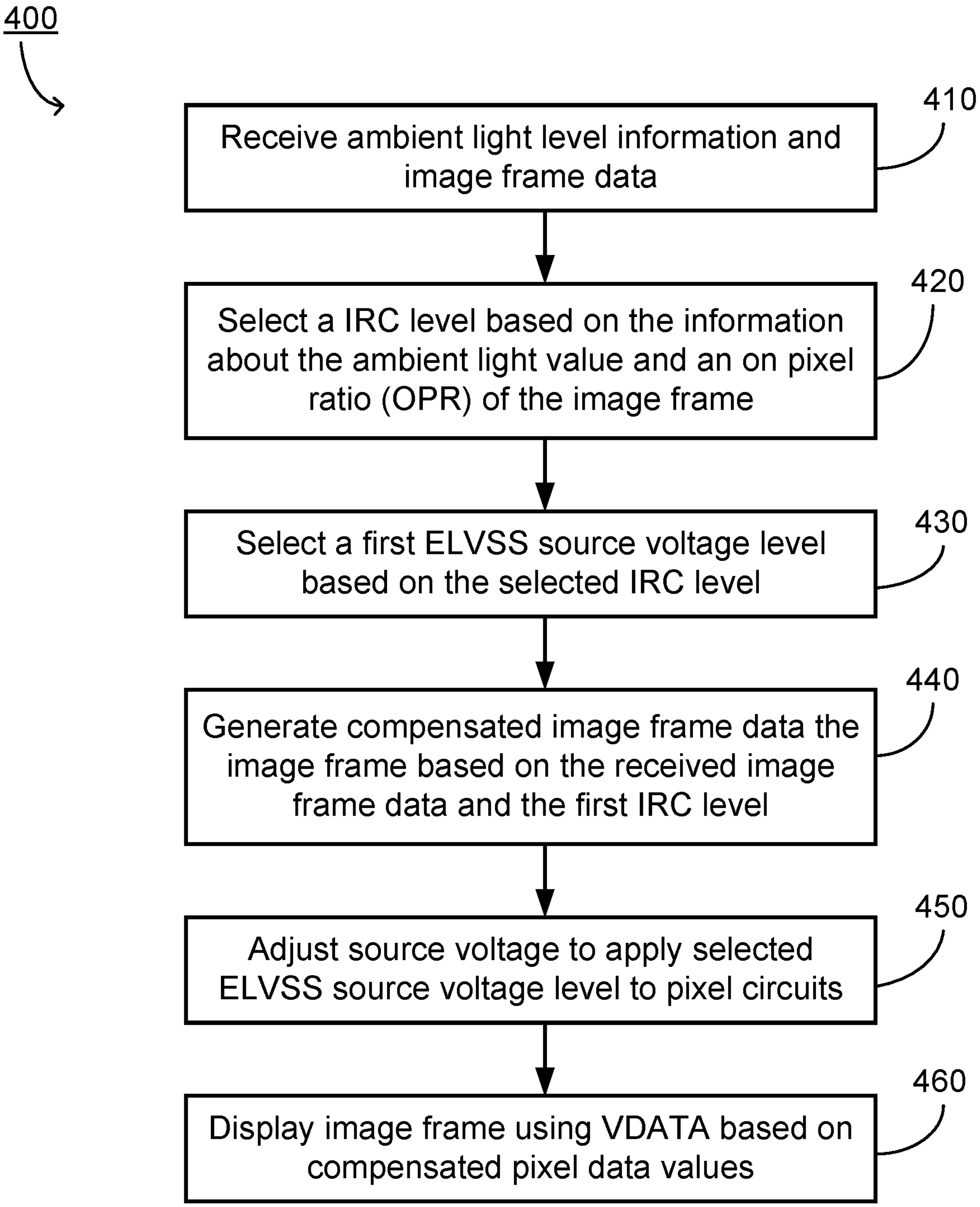
FIG. 4 is a flow chart of an example method for dynamic source voltage and current-resistance compensation adjustment of an AMOLED display panel.

Referring also to FIG. 4, an example method of operation 400 for implementing dynamic setting of an IRC and ELVSS level, e.g., using device 100, includes the following steps. In step 410, the DDIC receives information about an ambient light level and image frame data. The image frame data corresponds to a luminance level for each sub-pixel in a pixel for the display panel to display the image frame.

In step 420, the DDIC selects a first current-resistance compensation (IRC) setting from the various IRC settings based on the information about the ambient light value. In some embodiments, the DDIC can also analyze the image frame data and select the IRC setting based on information about the image frame, such as an on pixel ratio of the image frame. In some embodiments, OPR can be used to select the IRC setting. For example, an OPR % can be read/tracked from histogram data and that information is fed into the IRC setting selection. In step 430, the DDIC selects a source voltage (e.g., ELVSS) level from among the source voltage levels based on the selected IRC setting. In step 440, the DDIC generates compensated image frame data based on the received image frame data and the IRC setting. In step 450, the DDIC adjusts the source voltage applied to the pixels so that the source voltage corresponds to the selected level. Finally, in step 460, while the selected source voltage is applied by the DDIC to the display panel, the display panel is refreshed to display the image frame based on VDATA data signals corresponding to compensated pixel data values.

This process can be repeated at any suitable interval during operation of the device. For example, in some embodiments, IRC settings and/or source voltage settings can be dynamically adjusted whenever the ambient light conditions change. Alternatively, or additionally, the adjustment can be performed for each frame.

Generally, the maximum brightness of the display panel varies depending on the OLED, the amount of current used to drive the OLED, and the pulse duration used to drive the OLED. In some implementations, the display can be driven at a brightness of 1,000 nits or more (e.g., 1,200 nits or more, 1,300 nits or more, 1,400 nits or more, 1,500 nits or more, 1,600 nits or more, such as up to 1,800 nits). The display brightness can vary depending on the OPR for an image frame.

For example, the display panel can be driven to extremely high brightness (e.g., 1,200 nits or more) for relatively small OPR values (e.g., 10% or less, 5% or less, 2% or less, 1% or less).

In some embodiments, the display panel can be driven at a brightness of 700 nits or more (e.g., 800 nits or more, such as 1,000 nits) at full screen use (i.e., OPR of 100%).

In certain embodiments, the display panel can be driven at a relatively high brightness while retaining good color accuracy. For example, the device can operate the display in a high brightness mode while keeping IRC ON, which generally produces better color accuracy than operation with IRC OFF.

An example implementation is summarized in TABLE 2 below.

TABLE 2

| Ambient Light Level | Display Brightness at 100% OPR (nits) | Display Brightness at 1% OPR (nits) | IRC ratio | ELVSS Level |
|---|---|---|---|---|
| Low (e.g., 0-7,000 lux) | 0-500 | 0-500 | 1 | Low |
| Medium (e.g., 7,000-10,000 lux) | 1,000 | 1,300 | 1.3 | Medium |
| High (e.g., >10,000 lux) | 1,000 | 1,700 | 1.7 | High |

The IRC ratio values in TABLE 2 above are merely examples. Other values are possible, for example, two or more IRC ratio values the range from 0.9 (e.g., 1.0 or more, 1.1 or more, 1.2 or more, 1.3 or more, 1.4 or more) to 2.0 (e.g., 1.9 or less, 1.8 or less, 1.7 or less, 1.6 or less) can be used.

While the foregoing description is with respect to a mobile device (e.g., an Android or iOS smartphone), more generally, the techniques disclosed herein can be applied to other use cases for AMOLED displays. For example, dynamic IRC and source voltage settings can be implemented in AMOLED panels used in wearable devices (e.g., smart watches, AR/VR headsets), tablet computers, laptop computers, or in desktop displays. These technologies can also be used in OLED television sets and in automotive displays using AMOLED technologies.

Furthermore, the dynamic IRC and source voltage settings can be implemented in other display technologies that use active pixel addressing, such as active matrix microLED displays.

In general, aspects of the technology disclosed herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s). In a software implementation, software components and modules may be implemented using standard programming languages including, but not limited to, object-oriented languages (e.g., Java, C++, C#, Smalltalk, etc.), functional languages (e.g., ML, Lisp, Scheme, etc.), procedural languages (e.g., C, Pascal, Ada, Modula, etc.), scripting languages (e.g., Perl, Ruby, Python, JavaScript, VBScript, etc.), declarative languages (e.g., SQL, Prolog, etc.), or any other suitable programming language, version, extension or combination thereof.

A non-transitory computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc.

The method may also be implemented in hardware. A hardware implementation can employ discrete logic circuits having logic gates for implementing logic functions on data signals, an application-specific integrated circuit (ASIC) having appropriate combinational logic gates, a programmable gate array (PGA), a field programmable gate array (FPGA), etc. The hardware can be a computing systems that includes one or more computer processors that execute computer-executable program instructions stored in memory. For example, one or more computer processors can be be a microprocessor, digital signal processor (DSP), application specific integrated circuit (ASIC), or one or more field programmable gate arrays (FPGA). The computer processor may further include a PLC, programmable interrupt controller (PIC), programmable logic device (PLD), programmable read only memory (PROM), electronically programmable read only memory (EPROM or EEPROM), or other similar devices.

A number of implementations have been described. Other embodiments are in the following claims.

What is claimed is:

1. A method, comprising:

receiving, by a computing system, information about an ambient light level;

receiving, by the computing system, image frame data for displaying an image frame on an active matrix display panel comprising an array of pixels, each pixel comprising a light emitting diode (LED) and a pixel circuit configured to control an electric current supplied to the LED;

selecting, by the computing system, a selected current-resistance compensation (IRC) setting from among a plurality of IRC settings based on the information about the ambient light value;

selecting, by the computing system, a selected source voltage level from among a plurality of source voltage levels based on the selected IRC setting that was selected by the computing system based on the information about the ambient light value;

generating, by the computing system, compensated image frame data for the image frame based on the received image frame data and the selected IRC setting that was selected by the computing system based on the information about the ambient light value; and displaying the image frame by supplying data signals based on the compensated image frame data to corresponding pixels from the array of pixels, while applying a source voltage corresponding to the selected source voltage level to all of the pixels.

2. The method of claim 1, wherein the source voltage is applied to a cathode of the LED of each pixel from the array of pixels.

3. The method of claim 1, wherein the computing system selects the selected IRC setting based on a pixel ratio of the image frame.

4. The method of claim 1, wherein current-resistance compensation is turned on for the selected IRC setting.

5. The method of wherein current-resistance compensation is turned off for the selected IRC setting.

6. The method of claim 1, wherein the computing system is configured to:

select, as the selected source voltage level, a first source voltage level responsive to the ambient light level indicating a first ambient light; and select, as the selected source voltage level, a second source voltage level responsive to the ambient light level indicating a second ambient light level, the first ambient light level being higher than the second ambient light level, and the first source voltage level being higher than the second source voltage level.

7. The method of claim 1, wherein each pixel comprises a red LED, a green LED, and a blue LED, and for at least one of the plurality of IRC settings, an IRC ratio is equal to one, the IRC ratio being equal to $(L_R+L_G+L_B)/L_W$ where $L_R$, $L_G$, $L_B$, and $L_W$ correspond to a luminance of the display panel for full screen red, green, blue, and white emission, respectively.

8. The method of claim 7, wherein the computing system is configured to:

select, as the selected IRC setting, a first IRC setting responsive to the ambient light level indicating a first ambient light level; and select, as the selected IRC setting, a second IRC setting responsive to the ambient light level indicating a second ambient light level, the first ambient light level being higher than the second ambient light level, and the first IRC setting having a higher IRC ratio than the second IRC setting.

9. The method of claim 8, wherein the selected IRC ratio is greater than one.

10. The method of claim 1, wherein the computing system selects the selected source voltage level from a look up table comprising the plurality of source voltage levels.

11. The method of claim 1, wherein the display panel is an organic light emitting diode (OLED) display panel.

12. A device, comprising:

an active matrix display panel comprising an array of pixels each comprising a light emitting diodes (LED) and a pixel circuit configured to control an electric current supplied to the LED, wherein during operation a luminance of each pixel depends on a data signals for each pixel for an image frame and a source voltage applied to all of the pixels;

an ambient light sensor; and a computing system in communication with the display panel and the ambient light sensor, wherein the computing system is configured to receive information about an ambient light level from the ambient light sensor and image frame data for an image frame to be displayed on the display panel, wherein the computing system is further configured to select among a plurality of source voltage levels and a plurality of current-resistance compensation (IRC) levels based on the information about the ambient light value and apply the source voltage to all of the pixels at the selected source voltage level and to direct compensated data signals to the pixels to display the image frame, the compensated data signals corresponding to pixel data corrected based on the selected IRC setting.

13. The device of claim 12, wherein the computing system comprises a display driver integrated circuit configured to select among the plurality of source voltage levels and IRC settings and generate the compensated data signals and a source voltage selection signal based on the selected source voltage level and the selected IRC setting.

14. The device of claim 13, wherein the display driver integrated circuit comprises a look up table for setting the source voltage level.

15. The device of claim 13, wherein the display driver integrated circuit comprises a register for setting the IRC setting.

16. The device of claim 13, wherein the display driver integrated circuit comprises a power management integrated circuit configured to receive the selected source voltage level and apply the source voltage to all the pixels.

17. The device of claim 12, wherein the source voltage is applied to a cathode of the OLED of each of the pixels.

18. The device of claim 12, wherein each pixel circuit comprises a plurality of transistors.

19. The device of claim 12, wherein for a first ambient light level the computing system is configured to select a first source voltage level and for a second ambient light level the computing system is configured to select a second source voltage level, the first ambient light level being higher than the second ambient light level and the first source voltage level being higher than the second source voltage level.

20. The device of claim 19, wherein each pixel comprises a red LED, a green LED, and a blue LED, and for the first ambient light level the computing system is configured to select a first IRC setting and for the second ambient light level the computing system is configured to select a second IRC setting, the first IRC setting having a higher IRC ratio than the second IRC setting, the IRC ratio being equal to $(L_R+L_G+L_B)/L_W$ where $L_R$, $L_G$, $L_B$, and $L_W$ correspond to a luminance of the display panel for full screen red, green, blue, and white emission, respectively.

* * * * *